(12) United States Patent
Iwamura et al.

(10) Patent No.: US 11,151,016 B2
(45) Date of Patent: Oct. 19, 2021

(54) CONTROL-PROGRAM-DEVELOPMENT SUPPORTING APPARATUS, CONTROL-PROGRAM-DEVELOPMENT SUPPORTING SYSTEM, CONTROL-PROGRAM-DEVELOPMENT SUPPORTING METHOD, AND NON-TRANSITORY COMPUTER-READABLE STORAGE MEDIUM

(71) Applicant: OMRON Corporation, Kyoto (JP)

(72) Inventors: Shintaro Iwamura, Otsu (JP);
Masatoshi Takahara, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,126

(22) PCT Filed: Oct. 29, 2018

(86) PCT No.: PCT/JP2018/040052
§ 371 (c)(1),
(2) Date: Feb. 14, 2020

(87) PCT Pub. No.: WO2019/093170
PCT Pub. Date: May 16, 2019

(65) Prior Publication Data
US 2020/0233778 A1  Jul. 23, 2020

(30) Foreign Application Priority Data

Nov. 10, 2017  (JP) .............................. JP2017-216937

(51) Int. Cl.
*G06F 11/36*  (2006.01)
*G06F 8/30*  (2018.01)
(52) U.S. Cl.
CPC ............ *G06F 11/3624* (2013.01); *G06F 8/30* (2013.01)

(58) Field of Classification Search
CPC ............................... G06F 8/30; G06F 11/3624
(Continued)

(56) References Cited

U.S. PATENT DOCUMENTS

2009/0164976 A1\* 6/2009 Gritter et al. ......... G06F 11/364
717/127
2018/0121324 A1\* 5/2018 Tucker et al. ...... G06F 11/3624

FOREIGN PATENT DOCUMENTS

JP   H04370805    12/1992
JP   H05204629    8/1993
(Continued)

OTHER PUBLICATIONS

"International Search Report (Form PCT/ISA/210) of PCT/JP2018/040052 ," dated Jan. 29, 2019, with English translation thereof, pp. 1-3.
(Continued)

*Primary Examiner* — Wei Y Zhen
*Assistant Examiner* — Mohammed N Huda
(74) *Attorney, Agent, or Firm* — JCIPRNET (57) ABSTRACT

A control-program-development supporting apparatus (10) comprises an editing unit (11) and a display unit (14). The editing unit (11) executes editing of a control program and debugging of the control program. The display unit (14) displays the contents of the editing and the contents of the debugging. In addition, when the same processing is designated a plurality of times for a program construct or a variable to be debugged contained in the control program during executing debugging, the editing unit (11) causes the display unit (14) to display debugging supplementary information including at least one of past edited contents concerning the program construct or the variable to be debugged, changed contents of the control program, and related error information.

7 Claims, 6 Drawing Sheets

(58) Field of Classification Search
USPC .......................................................... 717/113
See application file for complete search history.

(56) References Cited

FOREIGN PATENT DOCUMENTS

| | | |
|---|---|---|
| JP | H1063546 | 3/1998 |
| JP | 2005316986 | 11/2005 |
| JP | 2006330867 | 12/2006 |
| JP | 2016200872 | 12/2016 |
| JP | 2017182661 | 10/2017 |

OTHER PUBLICATIONS

"Written Opinion of the International Searching Authority (Form PCT/ISA/237) of PCT/JP2018/040052," dated Jan. 29, 2019, with English translation thereof, pp. 1-8.
Youngseok Yoon et al., "Visualization of fine-grained code change history," 2013 IEEE Symposium on Visual Languages and Human Centric Computing, Sep. 2013, pp. 119-126.
"Search Report of Europe Counterpart Application", dated Jul. 29, 2021, p. 1-p. 7.
"Office Action of Japan Counterpart Application" with English translation thereof, dated Jun. 1, 2021, p. 1-p. 6.

* cited by examiner

| Operation details | Data collection source | Data to be collected |
|---|---|---|
| Downloading | Development program | All sources downloaded such as POU, circuit, and parameter |
| Online editing transmission | Development program | All sources edited and transmitted such as POU and circuit |
| Offline editing histories | Development program | Operation information such as changed POU and row number of circuit |
| Observation of designated variable | Development program | Information on variable |
| Writing of variable to controller | Development program | Information on variable |
| Setting of brake point | Development program | Information on break point such as POU and row number of circuit |
| Setting of bookmark | Development program | Information on bookmark such as POU and row number of circuit |
| Detection of power interruption of slave | Controller | Node number of slave, information on error |
| Detection of slight fault | Controller | Node number of slave, information on error |
| All-clearing of memory | Controller | Information on error |

| Index | Description | Value(s) | Value(c) |
|---|---|---|---|
| ⋮ | ⋮ | ⋮ | ⋮ |
| 003 | Realtime Autotuning・・・ | 17 | 100 |
| ⋮ | ⋮ | ⋮ | ⋮ |

413

(B)

| Entry | Time | Level | Souce | SouceDeails | Event Name |
|---|---|---|---|---|---|
| ⋮ | ⋮ | ⋮ | ⋮ | ⋮ | ⋮ |
| 1019 | 2016/7/31 9:58 | Observation | Axis | CommunicationPort | Link OFF |
| ⋮ | ⋮ | ⋮ | ⋮ | ⋮ | ⋮ |

CONTROL-PROGRAM-DEVELOPMENT SUPPORTING APPARATUS, CONTROL-PROGRAM-DEVELOPMENT SUPPORTING SYSTEM, CONTROL-PROGRAM-DEVELOPMENT SUPPORTING METHOD, AND NON-TRANSITORY COMPUTER-READABLE STORAGE MEDIUM

CROSS-REFERENCE TO RELATED APPLICATION

This application is a 371 application of the International PCT application serial no. PCT/JP2018/040052, filed on Oct. 29, 2018, which claims the priority benefits of Japan Patent Application No. 2017-216937, filed on Nov. 10, 2017. The entirety of each of the above-mentioned patent applications is hereby incorporated by reference herein and made a part of this specification.

TECHNICAL FIELD

The disclosure relates to a technique of supporting development of a control program.

BACKGROUND ART

Currently, factory automation (FA) systems are being widely implemented. An FA system includes a controller and a plurality of slave devices. A control program is provided in the controller, and operations and processes of the controller and operations and processes of the slave devices are set by the control program.

An apparatus that prepares such a control program has a configuration like that described in Patent Literature 1.

The apparatus that prepares a control program and includes the apparatus described in Patent Literature 1 normally has a debugging function.

CITATION LIST

Patent Literature

[Patent Literature 1]
Japanese Patent Laid-Open No. 2016-200872

SUMMARY OF INVENTION

Technical Problem

However, when a control program becomes larger in scale, the number of program organization units (POUs) or variables which are to be debugged also increases. In this case, identification of a position causing an error and dependencies between the POUs and the variables are complicated and a time for debugging is lengthened. Particularly, in the case of an error due to a complicated cause, it may be difficult for a programmer who is not well-acquainted with the control program to perform debugging.

Accordingly, an objective of the disclosure is to more easily identify the cause of an error or the like and to shorten the time for debugging.

Solution to Problem

A control-program-development supporting apparatus includes an editing unit and a display unit. The editing unit performs editing of a control program and debugging of the control program. The display unit displays contents of the editing and contents of the debugging. When the same process is designated for a program constituent or variable which is to be debugged and which is included in the control program a plurality of times at the time of debugging, the editing unit displays debugging assistance information including at least one of past editing contents of the program constituent or variable which is to be debugged, change contents of the control program, and relevant error information on the display unit.

With this configuration, when the same debugging process is performed a plurality of times, debugging assistance information which is referred to at the time of debugging is simultaneously displayed on a debugging screen.

In the control-program-development supporting apparatus, when the program constituent is edited continuously a plurality of times and is transmitted to a controller as a process for the program constituent, the editing unit may display the debugging assistance information associated with the program constituent on the display unit.

In the control-program-development supporting apparatus, the editing unit may set reception of observation of the designated variable as a process for the variable, and the editing unit may display the debugging assistance information associated with the variable on the display unit when the same variable is set in the reception of observation which has been performed the plurality of times.

These configurations represent a process example in which the process of displaying debugging assistance information is triggered. Since the debugging assistance information is displayed on the basis of the processes which are performed in normal debugging, no particular operation need be performed to display the debugging assistance information.

In the control-program-development supporting apparatus, the editing unit may display a comparison image for a position between the program constituent which is to be debugged and the program constituent which is to be debugged and which is included in the debugging assistance information on the display unit.

With this configuration, a program constituent which is to be debugged and a program constituent which is to be compared can be easily compared.

In the control-program-development supporting apparatus, the editing unit may display a comparison image between a parameter of the variable which is to be debugged and a parameter of the variable which is included in the debugging assistance information on the display unit.

With this configuration, a variable which is to be debugged and a variable which is to be compared can be easily compared.

A control-program-development supporting system includes: each configuration of the above-mentioned control-program-development supporting apparatus; and a server that is connected to the control-program-development supporting apparatus. The server stores the debugging assistance information. The editing unit acquires the past editing contents from the server.

With this configuration, since past editing contents are stored in the server, it is possible to enhance a storage capacity. Accordingly, a large amount of information for assisting with debugging can be displayed by the control-program-development supporting apparatus.

Advantageous Effects of Invention

According to the disclosure, it is possible to more easily identify the cause of an error or the like and to shorten the time for debugging.

BRIEF DESCRIPTION OF DRAWINGS

(A) of FIG. 11 is a diagram illustrating an example of a comparison screen and (B) of FIG. 11 is a diagram illustrating an example of a list of error information.

DESCRIPTION OF EMBODIMENTS

Hereinafter, an embodiment of the disclosure will be described with reference to the accompanying drawings.

Application Example

Figure 1:
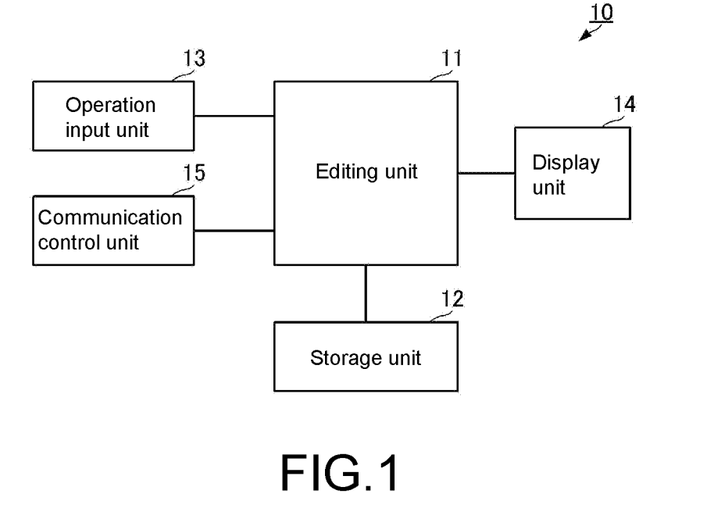
FIG. 1 is a functional block diagram illustrating a control-program-development supporting apparatus according to an embodiment of the disclosure.

First, an example to which the disclosure is applied will be described below with reference to FIG. 1. FIG. 1 is a functional block diagram illustrating a control-program-development supporting apparatus according to an embodiment of the disclosure.

As illustrated in FIG. 1, a control-program-development supporting apparatus 10 includes at least an editing unit 11 and a display unit 14.

The editing unit 11 performs editing and debugging of a control program. The editing unit 11 outputs an editing screen and a debugging screen of the control program to the display unit 14. The display unit 14 displays the editing screen and the debugging screen of the control program.

In this configuration, when the same process is designated for a program constituent or a variable which is to be debugged and which is included the control program at the time of debugging a plurality of times, the editing unit 11 detects the process. The editing unit 11 extracts debugging assistance information with detection of the process as a trigger. The debugging assistance information is information including at least one of past editing contents of a program constituent or variable which is to be debugged, change contents of the control program, and relevant error information. The editing unit 11 outputs the extracted debugging assistance information to the display unit 14. The display unit 14 displays the extracted debugging assistance information on the debugging screen to overlap the debugging screen. With this configuration and this process, a programmer can perform debugging while watching information for assisting with debugging associated with a debugging position on the screen.

Configuration Example

Figure 2:
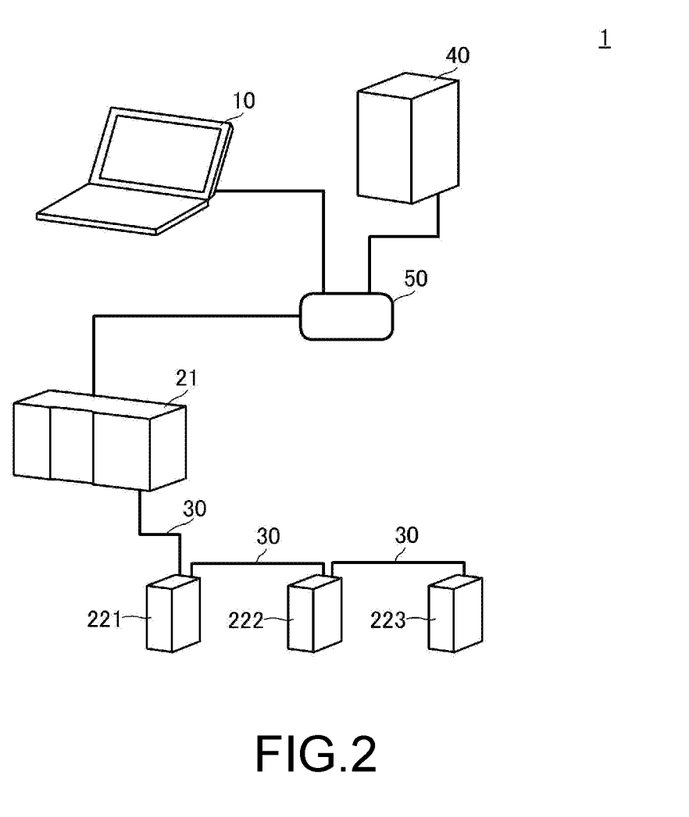
FIG. 2 is a diagram schematically illustrating a configuration of a control system including a control-program-development supporting system according to an embodiment of the disclosure.

A technique of supporting developing of a control program according to an embodiment of the disclosure will be described below with reference to the accompanying drawings. As described above, FIG. 1 is a functional block diagram illustrating a control-program-development supporting apparatus according to an embodiment of the disclosure. FIG. 2 is a diagram schematically illustrating a configuration of a control system including a control-program-development supporting system according to an embodiment of the disclosure.

As illustrated in FIG. 1, a control-program-development supporting apparatus 10 includes an editing unit 11, a storage unit 12, an operation input unit 13, a display unit 14, and a communication control unit 15. The editing unit 11 is connected to the storage unit 12, the operation input unit 13, the display unit 14, and the communication control unit 15.

The control-program-development supporting apparatus 10 is realized by an operation processing device such as a personal computer.

Specifically, the editing unit 11 is realized by an operation processing device such as a CPU, a program which is executed by the operation processing device, and the like. The editing unit 11 performs various processes associated with development of a control program such as editing and debugging of the control program.

The storage unit 12 is a storage area which is used for the operation processing device to perform various processes and is realized by a predetermined storage medium. Past editing contents which will be described later may be stored by enhancing the capacity of the storage unit 12.

The operation input unit 13 is realized by, for example, a keyboard and a mouse. The operation input unit 13 receives an operation input from an operator such as a programmer and transmits the received operation input to the editing unit 11.

The display unit 14 is realized by, for example, a liquid crystal display. The display unit 14 displays an editing screen of a control program and a debugging screen which are input from the editing unit 11 and information for assisting with debugging (debugging assistance information) such as past editing contents which will be described later.

The communication control unit 15 is an interface that connects the control-program-development supporting apparatus 10 to an external network.

The control-program-development supporting apparatus 10 is applied to a control system illustrated in FIG. 2.

As illustrated in FIG. 2, the control system 1 includes a control-program-development supporting apparatus 10, a controller 21, slave devices 221, 222, and 223, and a server 40. The controller 21 is connected to the slave devices 221, 222, and 223 via a control network 30. The control network 30 is set, for example, on the basis of Ethernet (registered trademark) or EtherCAT (registered trademark).

The control-program-development supporting apparatus 10, the controller 21, and the server 40 are connected to each other via an information communication network 50. The information communication network 50 is set, for example, on the basis of Ethernet (registered trademark).

The controller 21 receives a control program from the control-program-development supporting apparatus 10 and stores the received control program. The controller 21 controls processes of the host device and operations and processes of the slave devices 221, 222, and 223 in accordance with the control program.

The server 40 collects assistance information of debugging from the control-program-development supporting apparatus 10 and the controller 21 via the information communication network 50. The assistance information of debugging includes, for example, editing contents of a control program which was performed in the past in the control-program-development supporting apparatus 10 and error information of the controller 21 and the slave devices 221, 222, and 223. The server 40 may collect the assistance information of debugging directly from the control-program-development supporting apparatus 10 and the controller 21 or may collect the assistance information of debugging via the control-program-development supporting apparatus 10.

Figure 3:
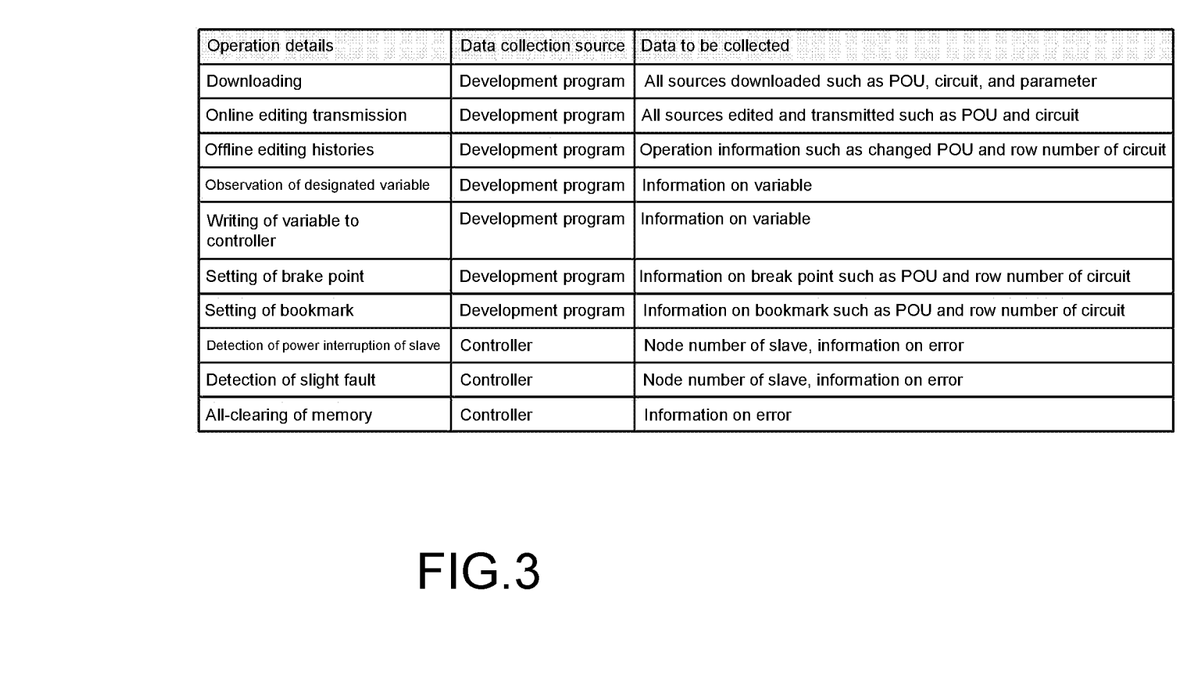
FIG. 3 is a table illustrating an example of debugging assistance information which is collected by a server.

FIG. 3 is a table illustrating an example of debugging assistance information which is collected by the server. The debugging assistance information is classified into items such as operation contents, a data collection source, and data to be collected, which are correlated with each other.

The operation contents are processes serving as a trigger for collection, and examples thereof include downloading, online editing transmission, an offline editing history, observation of a designated variable, writing of a variable to a controller, setting of a break point, setting of a bookmark, detection of power interruption of a slave, detection of a slight fault, and all-clearing of a memory.

The data collection source represents a target device in which the operation contents have been performed, and examples thereof include a development program (the control-program-development supporting apparatus 10) and the controller.

The data to be collected is information serving as a reference for the debugging assistance information and information for assisting with debugging, and examples thereof include program constituents POU, circuits, parameters of variables, row numbers of the POUs, row numbers of the circuits, node numbers of the slaves, and information on errors.

Such information may be stored in the control-program-development supporting apparatus 10. However, by storing such information in the server 40, it is possible to enhance a storage capacity for information. Accordingly, it is possible to keep an amount of debugging assistance information large and to more reliably and easily provide suitable assistance information.

Example (1) of Specific Process in Debugging

Figure 4:
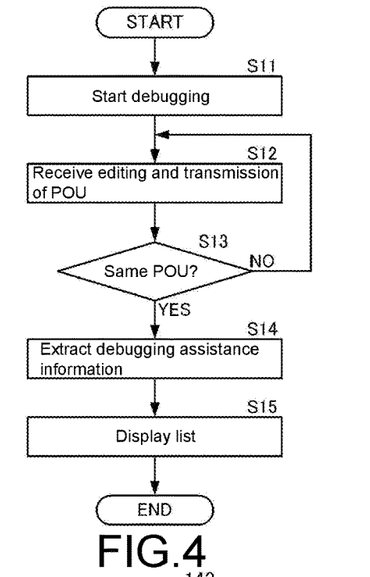
FIG. 4 is a flowchart illustrating an example of a process at the time of debugging.

FIG. 4 is a flowchart illustrating an example of a process at the time of debugging.

The editing unit 11 of the control-program-development supporting apparatus 10 receives start of debugging of a control program (S11). Debugging is performed with starting of a simulator or while connected to the controller 21 (in an online state).

When an error in debugging occurs, the editing unit 11 receives editing and transmission of a program constituent POU via the operation input unit 13 (S12).

When the editing and transmission operation is not performed on a single (the same) program constituent POU a plurality of times (for example, twice) (S13: NO), the editing unit 11 continues to perform debugging.

When the editing and transmission operation is performed on a single (the same) program constituent POU a plurality of times (for example, twice) (S13: YES), the editing unit 11 extracts debugging assistance information such as an editing history of the program constituent POU (past editing contents) associated with the program constituent POU at the debugging position from the server 40 (S14). At this time, the editing unit 11 extracts the editing history of the program constituent POU using the data to be edited illustrated in FIG. 3 as a keyword.

The editing unit 11 generates a list image of the extracted editing history of the program constituent POU and outputs the generated list image to the display unit 14. The display unit 14 displays the list image (S15).

Figure 5:
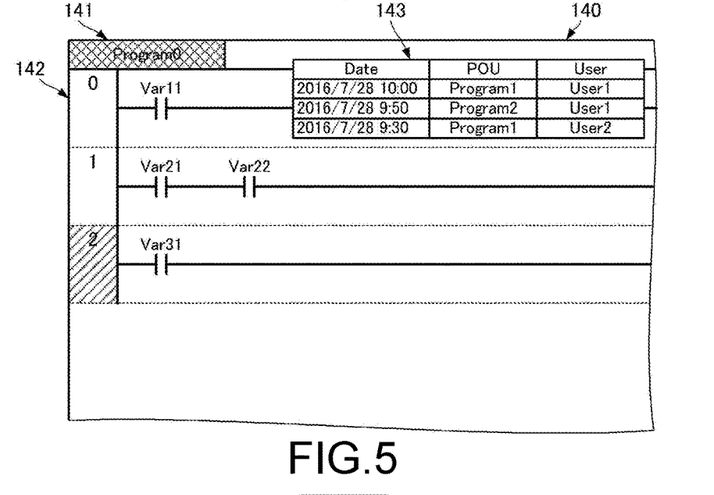
FIG. 5 is a diagram illustrating an example of a display screen at the time of debugging.

FIG. 5 is a diagram illustrating an example of a display screen at the time of debugging. As illustrated in FIG. 5, a display screen 140 includes an index 141, a debugging screen 142, and a list of assistance information 143. A program which is being debugged is displayed in the index 141. A progress state of debugging, program constituents POU of a program which is being debugged, and the like are displayed in the debugging screen 142.

A list image of the extracted editing history is displayed in the list of assistance information 143. An editing date and time Date, an edited program constituent POU, an editor User, and the like are included in the list of assistance information 143. At this time, the plurality of pieces of assistance information are preferably displayed in a time series. Accordingly, it is possible to easily recognize the newest editing history. Arrangement of the plurality of pieces of assistance information is not limited thereto and the plurality of pieces of assistance information may be arranged, for example, on the basis of a degree of coincidence of a keyword. When the degree of coincidence of a keyword is used, it is possible to easily recognize an editing history which is more suitable for this debugging.

By employing this configuration and process, a programmer can easily ascertain assistance information suitable for debugging of a program constituent POU which is to be debugged. Accordingly, it is possible to reduce a programmer's burden for debugging.

Figure 6:
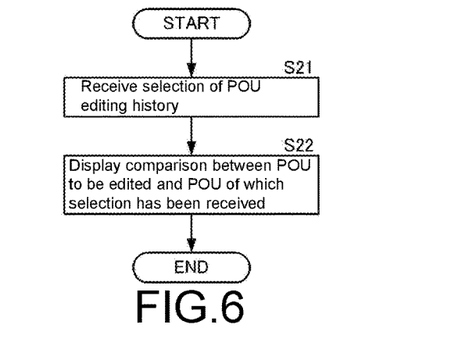
FIG. 6 is a flowchart illustrating an example of a process of displaying a comparison screen.

The control-program-development supporting apparatus 10 performs the following process. FIG. 6 is a flowchart illustrating an example of a process of displaying a comparison screen.

The editing unit 11 receives selection of an item in the list of assistance information 143 illustrated in FIG. 5 via the operation input unit 13 (S21).

Figure 7:
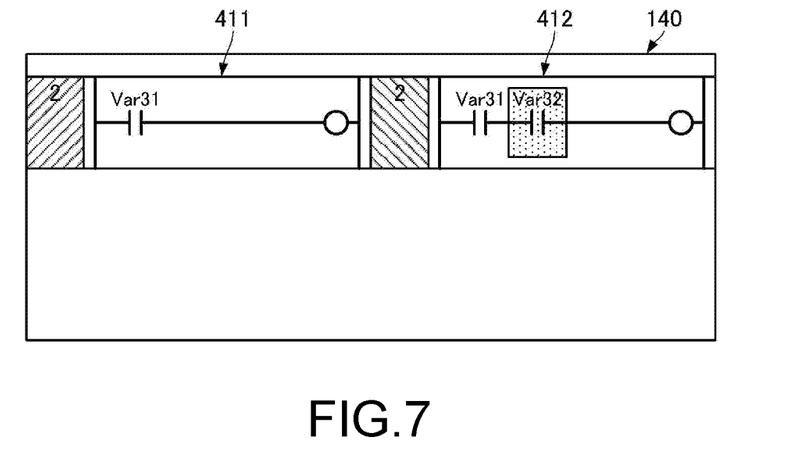
FIG. 7 is a diagram illustrating an example of a comparison screen.

The editing unit 11 generates a comparison image between a program constituent POU which is being debugged and a program constituent POU of the selected assistance information and the display unit 14 displays the comparison image (S22). FIG. 7 is a diagram illustrating an example of a comparison screen. As illustrated in FIG. 7, the display screen 140 is partitioned in the horizontal direction, and a display area 411 of the program constituent POU which is being debugged and a display area 412 of the program constituent POU of the selected assistance information are arranged in parallel. Positions that differ in the program constituent POU between the display area 411 and the display area 412 are emphasized and displayed.

Accordingly, a programmer can visually recognize the program constituent POU which is being debugged and the program constituent POU of the selected assistance information in parallel. Accordingly, a programmer can easily recognize a difference between the program constituent POU which is being debugged and the program constituent POU of the selected assistance information and can easily perform debugging. By emphasizing and displaying the different positions, a programmer can more clearly and easily recognize a difference between the program constituent POU which is being debugged and the program constituent POU of the selected assistance information and can easily perform debugging.

Example (2) of Specific Process in Debugging

Figure 8:
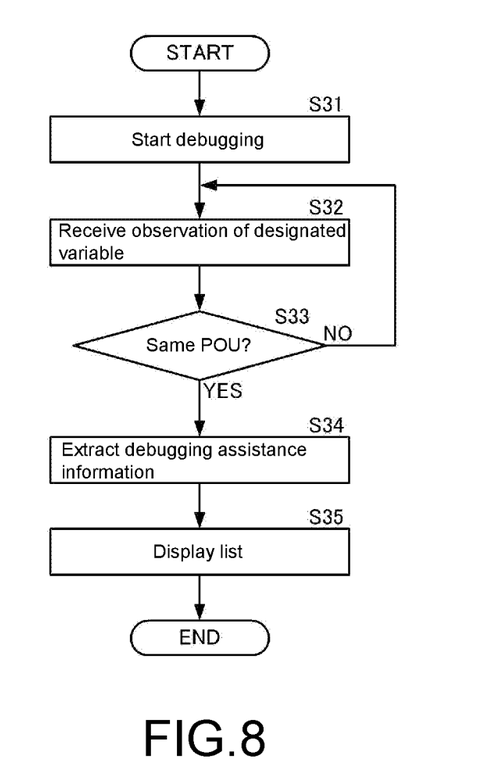
FIG. 8 is a flowchart illustrating another example of a process at the time of debugging.

FIG. 8 is a flowchart illustrating another example of a process at the time of debugging.

The editing unit 11 of the control-program-development supporting apparatus 10 receives start of debugging of a control program (S31). Debugging is performed with starting of a simulator or while connected to the controller 21 (in an online state).

The editing unit 11 receives observation of a designated variable via the operation input unit 13 (S32). Specifically, the editing unit 11 sets a watch window and observes a variable which is registered in the watch window.

When a single (the same) variable is not designated a plurality of times (for example, twice) (S33: NO), the editing unit 11 continues to perform debugging.

When a single (the same) variable is designated a plurality of times (S33: YES), the editing unit 11 extracts debugging assistance information such as an editing history of a program constituent POU associated with the variable from the server 40 (S34). At this time, the editing unit 11 extracts the editing history of the program constituent POU using the data to be edited which is illustrated in FIG. 3 as a keyword.

The editing unit 11 generates a list image of the extracted editing history of the program constituent POU and outputs the list image to the display unit 14. Alternatively, the editing unit 11 generates a list image of a history of the corresponding function in the editing history of the program constituent POU. The display unit 14 displays the list images (S35).

Figure 9:
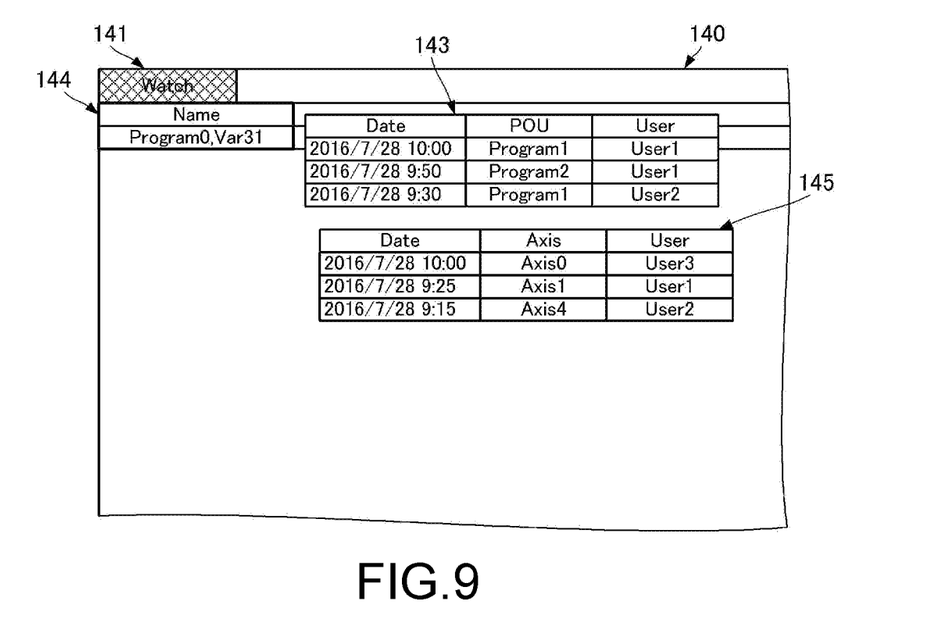
FIG. 9 is a diagram illustrating an example of a display screen at the time of debugging.

FIG. 9 is a diagram illustrating an example of a display screen at the time of debugging. As illustrated in FIG. 9, the display screen 140 includes an index 141, a watch window setting field 144, a list of assistance information 143, and a list of assistance information on a variable 145. Starting of a watch window is displayed in the index 141. A designated variable is displayed in the watch window setting field 144.

A list image of the editing history which has been extracted as described above is displayed in the list of assistance information 143. The list of assistance information 143 includes an editing date and time Date, an edited program constituent POU, and an editor User.

The list of assistance information on a variable 145 includes an editing date and time Date, a control element of which a variable is to be set (an axis in the example illustrated in FIG. 9), and an editor User.

At this time, the pieces of assistance information are preferably displayed in a time series. Accordingly, it is possible to easily recognize a newest editing history.

By employing this configuration and process, a programmer can easily ascertain assistance information suitable for debugging of a variable which is to be debugged. Accordingly, it is possible to reduce a programmer's burden for debugging.

Figure 10:
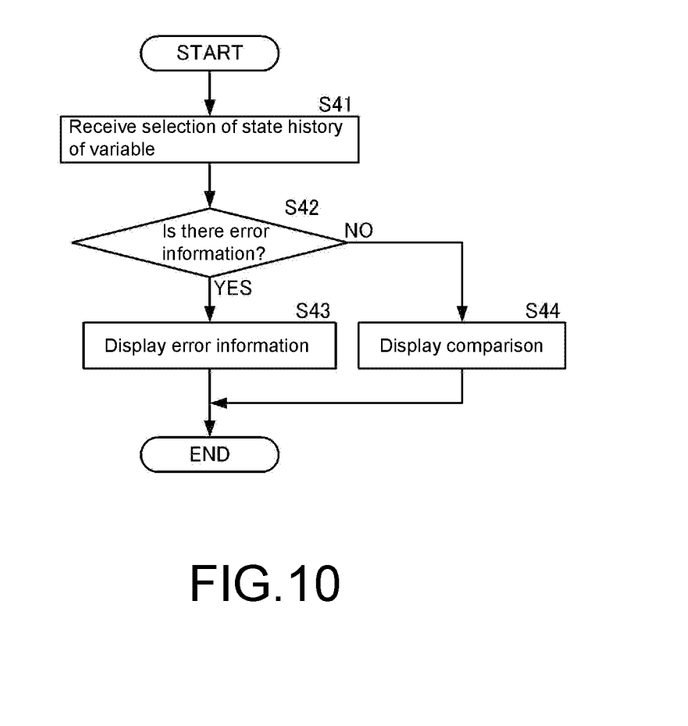
FIG. 10 is a flowchart illustrating an example of a process of displaying error information or a comparison screen.

The control-program-development supporting apparatus 10 performs the following process. FIG. 10 is a flowchart illustrating an example of a process of displaying error information or a comparison screen.

The editing unit 11 receives selection of an item in the list of assistance information on a variable 145 illustrated in FIG. 9 via the operation input unit 13 (S41).

When there is error information in the selected item (S42: YES), the editing unit 11 generates error information and the display unit 14 displays the error information (S43). When there is no error information in the selected item (S42: NO), the editing unit 11 generates a comparison image and the display unit 14 displays the comparison image.

Figure 11:
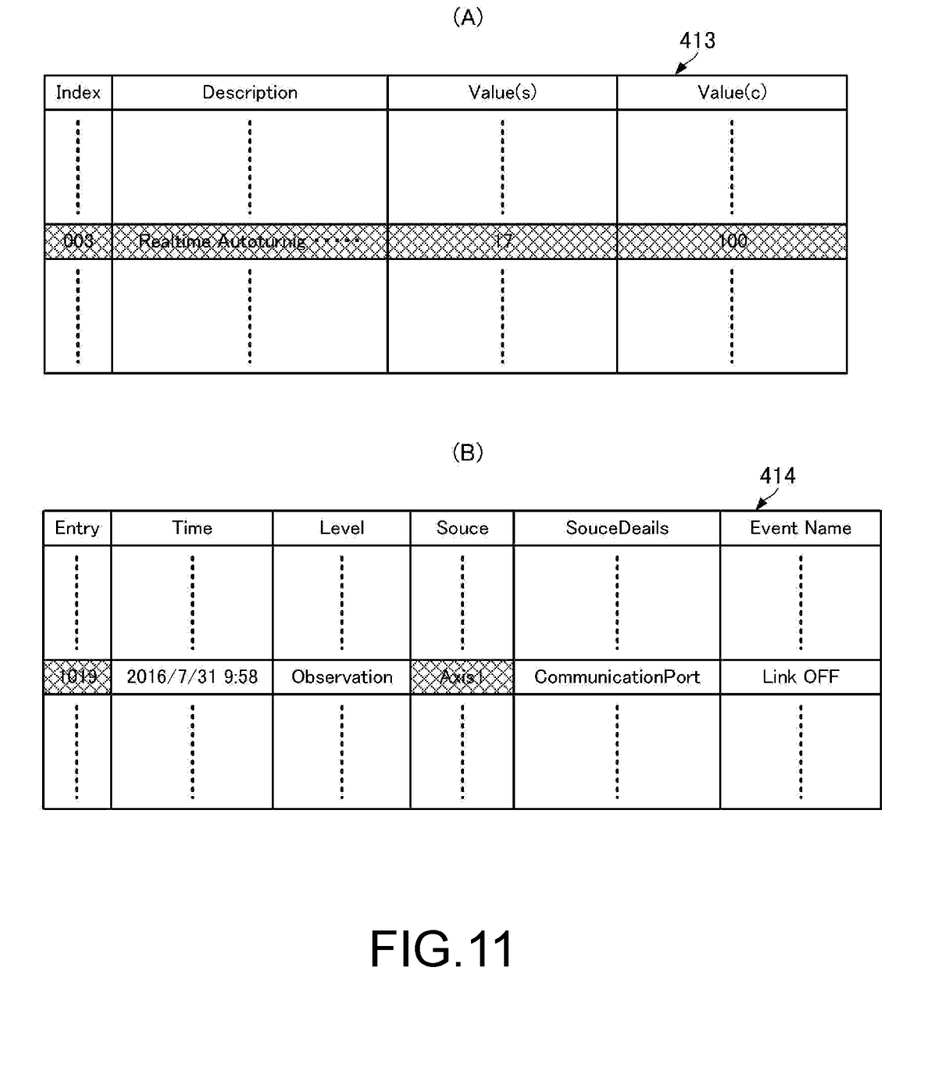

(A) of FIG. 11 is a diagram illustrating an example of a comparison screen. As illustrated in (A) of FIG. 11, a value of a variable which is to be debugged and a value of a variable in the selected assistance information are displayed in parallel in the comparison screen 413.

Accordingly, a programmer can easily recognize a difference between a variable which is being debugged and a variable in the selected assistance information and easily perform debugging.

(B) of FIG. 11 is a diagram illustrating an example of a list of error information. As illustrated in (B) of FIG. 11, a list of error information associated with a variable which is being debugged is displayed in the list of error information 414.

Accordingly, a programmer can easily recognize an error associated with a variable which is being debugged and easily perform debugging.

The processes in the above-mentioned embodiments can be appropriately combined, and operational advantages corresponding to the combinations are achieved by the combinations. Accordingly, a programmer can more easily perform debugging.

The invention claimed is:

1. A control-program-development supporting apparatus comprising:
    an editing unit that performs editing of a control program and debugging of the control program; and
    a display unit that displays contents of the editing and contents of the debugging,
    wherein, when the same process is designated for debugging a program constituent or variable which is to be debugged and which is included in the control program has been performed a plurality of times, the editing unit displays debugging assistance information including at least one of past editing contents of the program constituent or variable which is to be debugged, change contents of the control program, and relevant error information on the display unit,
    wherein the editing unit displays a comparison image between the program constituent which is to be debugged and the past editing contents of program constituent which is included in the debugging assistance information on the display unit, wherein a difference between the program constituent to be debugged and the past editing contents of program constituent is emphasized in the comparison image.

2. The control-program-development supporting apparatus according to claim 1, wherein, when the program constituent is edited continuously a plurality of times and is transmitted to a controller as a process for the program constituent, the editing unit displays the debugging assistance information associated with the program constituent on the display unit.

3. The control-program-development supporting apparatus according to claim 1, wherein the editing unit sets reception of observation of the designated variable as a process for the variable, and
wherein the editing unit displays the debugging assistance information associated with the variable on the display unit when the same variable is set in the reception of observation which has been performed the plurality of times.

4. The control-program-development supporting apparatus according to claim 3, wherein the editing unit displays a comparison image between a parameter of the variable which is to be debugged and a parameter of the variable which is included in the debugging assistance information on the display unit.

5. A control-program-development supporting system comprising:
each configuration of the control-program-development supporting apparatus according to claim 1; and
a server that is connected to the control-program-development supporting apparatus,
wherein the server stores the debugging assistance information, and
wherein the editing unit acquires the past editing contents from the server.

6. A control-program-development supporting method comprising:
an editing process of performing editing of a control program and debugging of the control program; and
a display process of displaying contents of the editing and contents of the debugging,
wherein, when the same process is designated for debugging a program constituent or variable which is to be debugged and which is included in the control program has been performed a plurality of times, the editing process includes extracting debugging assistance information including at least one of past editing contents of the program constituent or variable which is to be debugged, change contents of the control program, and relevant error information, and
wherein the display process includes displaying the debugging assistance information,
wherein the editing process further includes displaying a comparison image between the program constituent which is to be debugged and the past editing contents of program constituent which is included in the debugging assistance information on the display unit,
wherein a difference between the program constituent to be debugged and the past editing contents of program constituent is emphasized in the comparison image.

7. A non-transitory computer-readable storage medium recording a control-program-development supporting program causing an operation device to perform:
an editing process of performing editing of a control program and debugging of the control program; and
a display process of displaying contents of the editing and contents of the debugging,
wherein, when the same process is designated for debugging a program constituent or variable which is to be debugged and which is included in the control program has been performed a plurality of times, the editing process includes extracting debugging assistance information including at least one of past editing contents of the program constituent or variable which is to be debugged, change contents of the control program, and relevant error information, and
wherein the display process includes displaying the debugging assistance information,
wherein the editing process further includes displaying a comparison image between the program constituent which is to be debugged and the past editing contents of program constituent which is included in the debugging assistance information on the display unit,
wherein a difference between the program constituent to be debugged and the past editing contents of program constituent is emphasized in the comparison image.

* * * * *